(12) United States Patent
Kjallstrom et al.

(10) Patent No.: US 11,087,551 B2
(45) Date of Patent: Aug. 10, 2021

(54) SYSTEMS AND METHODS FOR ATTACHING SYNCHRONIZED INFORMATION BETWEEN PHYSICAL AND VIRTUAL ENVIRONMENTS

(71) Applicant: EON REALITY, INC., Irvine, CA (US)

(72) Inventors: Jan Kjallstrom, Monarch Beach, CA (US); Yazhou Huang, Mission Viejo, CA (US)

(73) Assignee: EON REALITY, INC., Irvine, CA (US)

( * ) Notice: Subject to any disclaimer, the term of this patent is extended or adjusted under 35 U.S.C. 154(b) by 0 days.

(21) Appl. No.: 16/689,734

(22) Filed: Nov. 20, 2019

(65) Prior Publication Data

US 2020/0160607 A1    May 21, 2020

Related U.S. Application Data

(60) Provisional application No. 62/770,555, filed on Nov. 21, 2018.

(51) Int. Cl.
*G06T 19/00* (2011.01)
*G06F 3/01* (2006.01)
*G06K 9/00* (2006.01)
*G02B 27/01* (2006.01)

(52) U.S. Cl.
CPC .......... *G06T 19/006* (2013.01); *G02B 27/017* (2013.01); *G06F 3/011* (2013.01); *G06F 3/017* (2013.01); *G06K 9/00671* (2013.01); *G02B 2027/014* (2013.01); *G02B 2027/0138* (2013.01)

(58) Field of Classification Search
CPC . G06T 19/006; G06T 2219/004; G06F 3/011; G06F 3/017; G06K 9/00671; G02B 27/017; G02B 2027/0138; G02B 2027/014; G02B 2027/0187
See application file for complete search history.

(56) References Cited

U.S. PATENT DOCUMENTS

| | | | |
|---|---|---|---|
| 2002/0056011 A1* | 5/2002 | Nardone | G06F 16/27 709/248 |
| 2016/0026253 A1 | 1/2016 | Bradski et al. | |
| 2017/0213473 A1* | 7/2017 | Ribeira | G16H 40/67 |
| 2017/0309070 A1 | 10/2017 | SanGiovanni et al. | |
| 2018/0131907 A1* | 5/2018 | Schmirler | G05B 23/0216 |
| 2018/0293802 A1* | 10/2018 | Hendricks | G09B 23/30 |
| 2019/0324549 A1* | 10/2019 | Araki | G06F 3/04815 |

* cited by examiner

*Primary Examiner* — William A Beutel
(74) *Attorney, Agent, or Firm* — Innovation Capital Law Group, LLP; Vic Lin

(57) ABSTRACT

To facilitate virtual training, employee on-boarding, knowledge transfer and remote assistance, embodiments provide a digital note viewable in a virtual environment which may be attached to a physical machine and viewable when a user is engaged with the system. When a user sees the machine through either an augmented reality device or a virtual reality device, the digital note is displayable and selectable. Selection of the digital note access information stored in association with the note and the object the note is attached to. The note may be modified in one instance, which synchronizes the note in any other instances. For example, modifying a digital note attached to a physical object in an AR environment causes a copy of the digital note to be modified in the same way in a digital twin of the object in a VR environment.

18 Claims, 15 Drawing Sheets

SYSTEMS AND METHODS FOR ATTACHING SYNCHRONIZED INFORMATION BETWEEN PHYSICAL AND VIRTUAL ENVIRONMENTS

CROSS-REFERENCE TO RELATED APPLICATION

This application claims benefit under 35 U.S.C. § 119(e) of U.S. Provisional Application having Ser. No. 62/770,555 filed Nov. 21, 2018, which is hereby incorporated by reference herein in its entirety.

FIELD OF THE INVENTION

The present invention relates in general to display systems and methods. More particularly, the invention is directed to systems and methods for attaching synchronized information between physical and virtual environments.

BACKGROUND OF THE INVENTION

Some virtual systems are focused on the notion of tracking and may include annotating the movement of a user by displaying the trace to another user within a virtual reality/augmented reality (VR/AR) environment. For example, in an immersive multi-user system, each user can publish content which may be displayed for all users in a synchronous or asynchronous viewing session.

SUMMARY OF THE INVENTION

In the first aspect, a method of synchronizing information of an object for use in virtual environments is disclosed. The method comprises: receiving by a processor, image data of a first instance of an object, wherein the first instance of the object is a physical object pointed to by a user, viewed through an augmented reality scene; identifying a point on the physical object pointed to by the user; receiving by the processor, digital information input by the user, wherein the digital information is associated with the physical object; associating the received digital information with the point on the physical object in a stored file associated with the physical object; generating an icon displayed to represent the digital information; displaying the icon as attached to the physical object in a first virtual environment; receiving image data of a second instance of the object in a second virtual environment; identifying a location on the second instance of the object corresponding to the point on the physical object; attaching an anchor to the identified location on the second instance of the object corresponding to the point on the physical object; and synchronizing the received digital information associated with the physical object to the anchor attached to the second instance of the object.

In a second aspect, a computer program product for synchronizing information of an object for use in virtual reality environments is disclosed. The computer program product comprises a non-transitory computer readable storage medium having computer readable program code embodied therewith. The computer readable program code is configured to: receive by a processor, image data of a first instance of an object, wherein the first instance of the object is a physical object pointed to by a user, viewed through an augmented reality scene; identify a point on the physical object pointed to by the user; receive by the processor, digital information input by the user, wherein the digital information is associated with the physical object; associate the received digital information with the point on the physical object in a stored file associated with the physical object; generate an icon displayed to represent the digital information; display the icon as attached to the physical object in a first virtual environment; receive image data of a second instance of the object in a second virtual environment; identify a location on the second instance of the object corresponding to the point on the physical object; attach an anchor to the identified location on the second instance of the object corresponding to the point on the physical object; and synchronize the received digital information associated with the physical object to the anchor attached to the second instance of the object.

In another aspect, a training system is disclosed. The system comprises: a computer server; an augmented reality device in communication with the computer server, wherein the augmented reality device is configured to display an augmented reality superimposed on a physical environment; a second device in communication with the computer server and the augmented reality device; and a processor in at least one of the computer server, the augmented reality device, and the second device. The processor is configured to: receive image data of a first instance of an object, wherein the first instance of the object is a physical object pointed to by a user, viewed through an augmented reality scene of the augmented reality device; identify a point on the physical object pointed to by the user; receive by the processor, digital information input by the user, wherein the digital information is associated with the physical object; associate the received digital information with the point on the physical object in a stored file associated with the physical object; generate an icon displayed to represent the digital information; display the icon as attached to the physical object in a first virtual environment; receive image data of a second instance of the object in a second virtual environment viewed through the second device; identify a location on the second instance of the object corresponding to the point on the physical object; attach an anchor to the identified location on the second instance of the object corresponding to the point on the physical object; and synchronize the received digital information associated with the physical object to the anchor attached to the second instance of the object.

These and other features and advantages of the invention will become more apparent with a description of preferred embodiments in reference to the associated drawings.

DETAILED DESCRIPTION OF THE PREFERRED EMBODIMENTS

Figure 1:
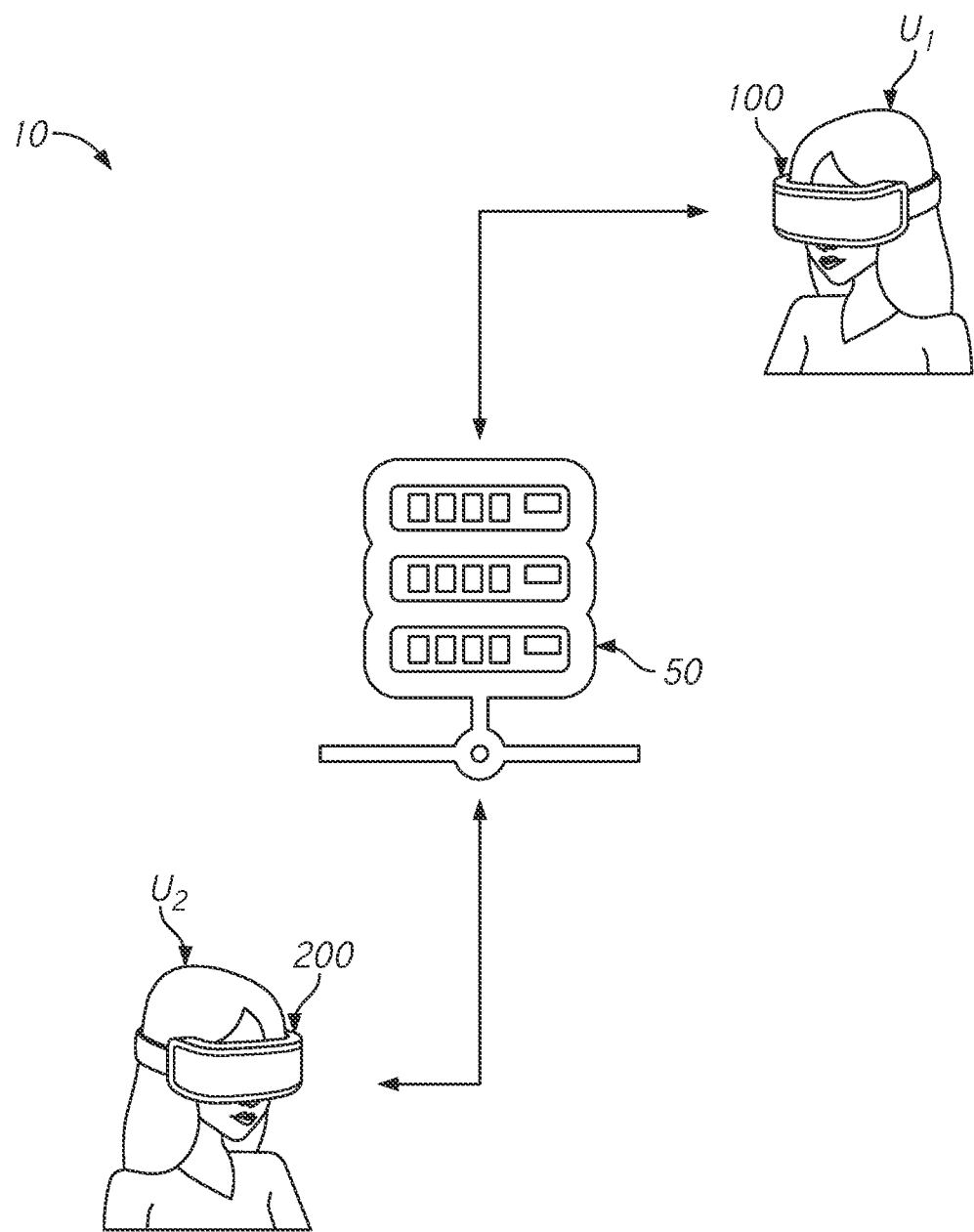
FIG. 1 is a schematic view of a virtual reality/augmented reality system for synchronizing information of an object according to an exemplary embodiment.
Figure 2:
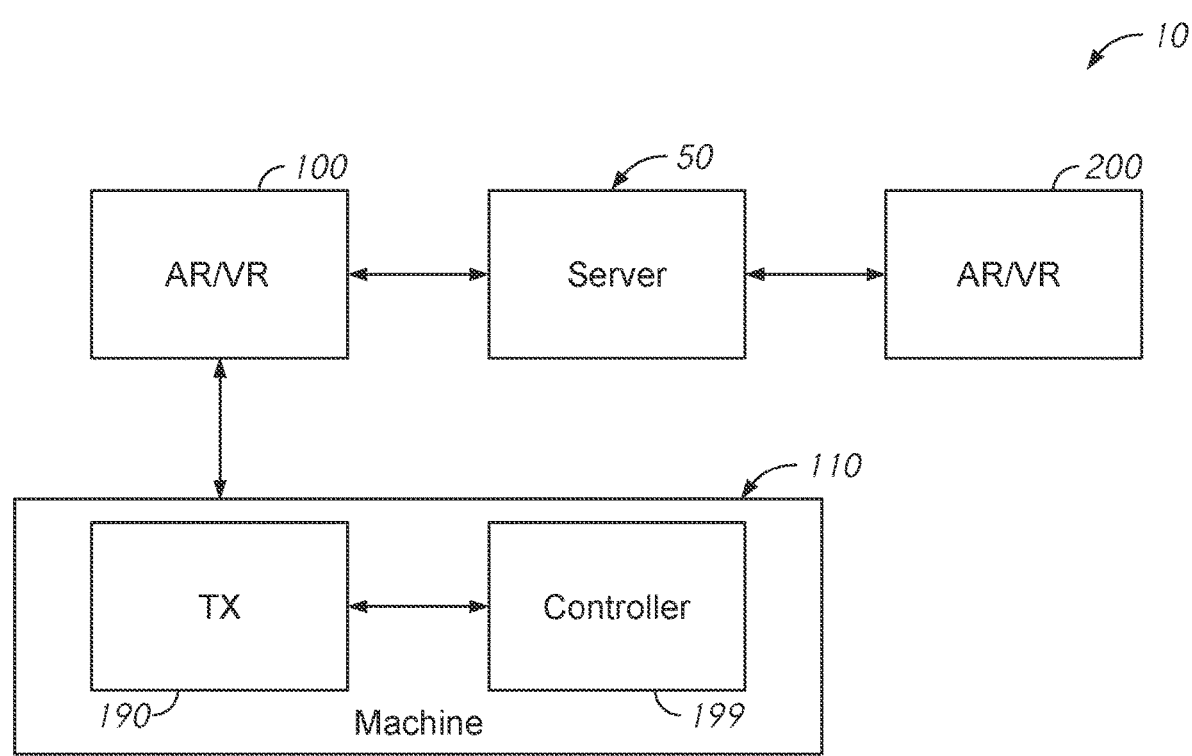
FIG. 2 is a block diagram of a system synchronizing information of an object for use in virtual environments according to an exemplary embodiment.

The following preferred embodiments, in general, are directed to virtual training systems and related processes. Referring to FIGS. 1 and 2, an example of a system 10 is shown according to an exemplary embodiment. The system 10 generally includes a first augmented reality device 100 and a second augmented/virtual reality device 200 in wireless communication with each other through a server 50. In one aspect, to facilitate virtual training, employee on-boarding, knowledge transfer and remote assistance, embodiments of the subject technology provide a training environment where a user (for example, U1) donning the device 100 may be trained virtually on how to operate a piece of machinery by a user U2 operating the device 200. As will be shown, in some embodiments, the user is working on a physical piece of equipment (for example, a machine) 110 (sometimes referred as "machine 110" in the context of the disclosure) or in a physical environment. In some embodiments, the user U1 is inside a virtual environment where he performs a training task on a digital replica (digital twin) of the machine 110 from the physical world following step by step instructions. In other embodiments, the user U1 may be in a physical world but seeing the world through augmented reality through the device 100. In some embodiments, the machine 110 may have its own on-board controller 199 and the device 100 may access information from the machine 110 through communication with a transmitter 190 in the machine 110.

Figure 3:
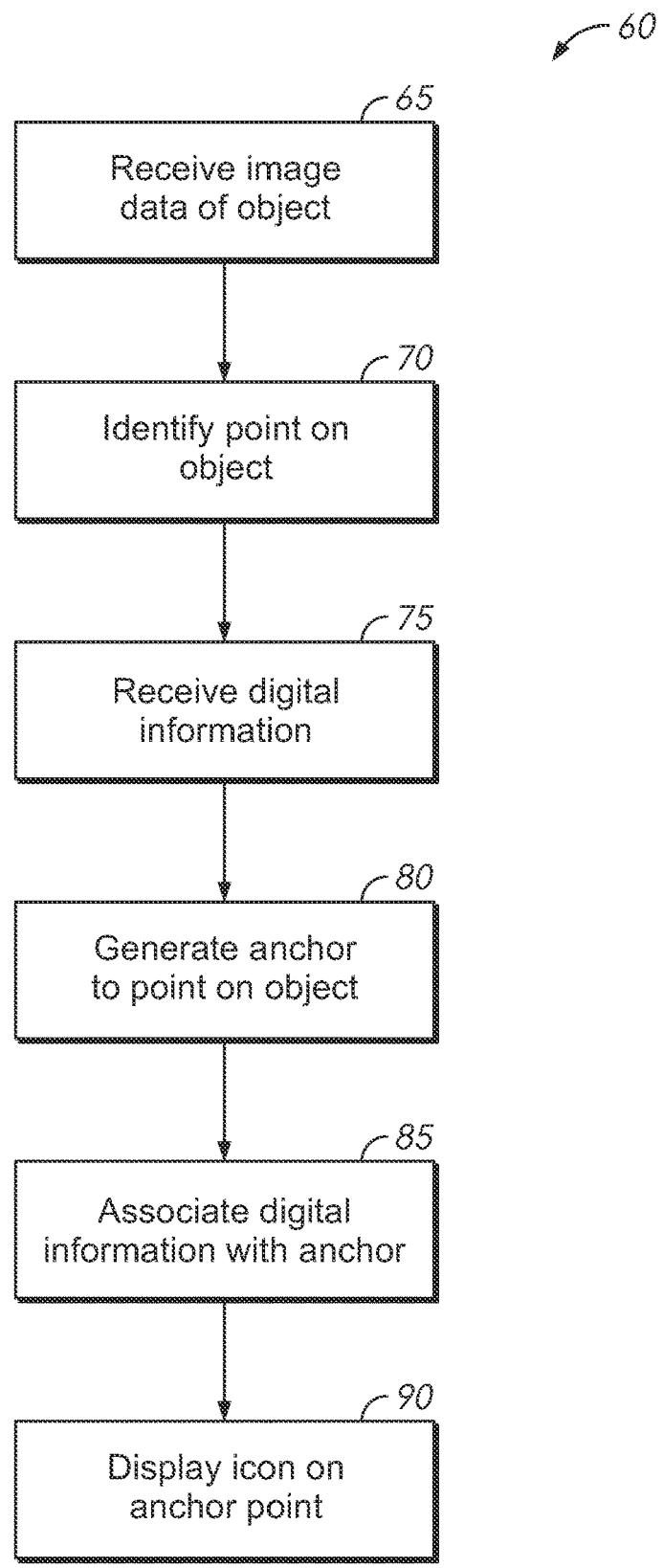
FIG. 3 is a flowchart of a process for synchronizing information of an object for use in virtual environments according to an exemplary embodiment.

Referring now to FIG. 3 (with concurrent reference to FIGS. 1 and 2), a method 60 of synchronizing information of an object for use in virtual environments is shown according to an exemplary embodiment. In one aspect of the subject technology, the user creates a digital note which is attached to a digital replica of the machine or physical environment. The digital note may be stored for example, in the server 50 and may be retrieved as needed (from either device 100 or device 200) when interacting with the machine 110, a digital replica of the machine, or during a future session involving the machine. The digital note carries a piece of information regarding an element of the machine. In some embodiments, the digital note includes a particular step of a training session. A user may attach the digital note to the virtual machine for later reference. The digital note may for example, be a text memo, a voice memo, a drawing, a video clip, an audio clip, a hyperlink to a webpage, an animated sequence or a virtual object depicting the task at hand. The digital note may then be stored in the system and synchronized between the machine in the physical world and its digital twin file in the virtual environment. Later, for example, when the user performs the task on the machine in the physical world, the digital note may be retrieved from the system and virtually attached to the machine. The user is able to see the digital note virtually attached to the machine in the physical world using for example, a type of augmented reality (AR) device.

The method 60 may begin by receiving 65 image data of an object. The object may be a machine being worked on or operated, a part of a machine, a building structure or other physical element. The image data of the object may be captured and, in some embodiments, replicated if necessary. In some embodiments, receiving the image data may be retrieving a stored file of the object (its image). The system may receive 70 an identified point on the object. The system may receive 75 digital information from the user about the object (or the point on the object which may be an element of the object (for example, a bolt or a crack in the surface)). The system may generate 80 an anchor (for example, a stored coordinate and icon associated with the coordinate) for the point on the object. The system may associate 85 the digital information with the anchor point. An icon may be displayed 90 on the anchor point which can be selected by the user. Selection of the icon may generate the stored digital information as a digital note to the user. The digital note created by the user may be in the form of a digital visual memo, a text memo, a voice memo, a drawing, an audio clip, a moving video clip, a hyperlink to a webpage, an animated sequence, or a virtual object. The digital note may also combine two or more elements mentioned above.

In some embodiments, attaching a virtual digital note may be reversed in a way that the digital note is first created by the user and attached to the machine in the physical world, and later retrieved and shown to the user as being attached to the digital twin of the machine in a virtual environment.

In the description that follows, reference will be made primarily to the device 100 however, in some embodiments, the device 200 may be a copy of the device 100 and operates in the same manner. Thus, any description to device 100 may also be understood to apply to the device 200. The following figures include a series of illustrations which show an example application of the system's use and the underlying processes.

Figure 4:
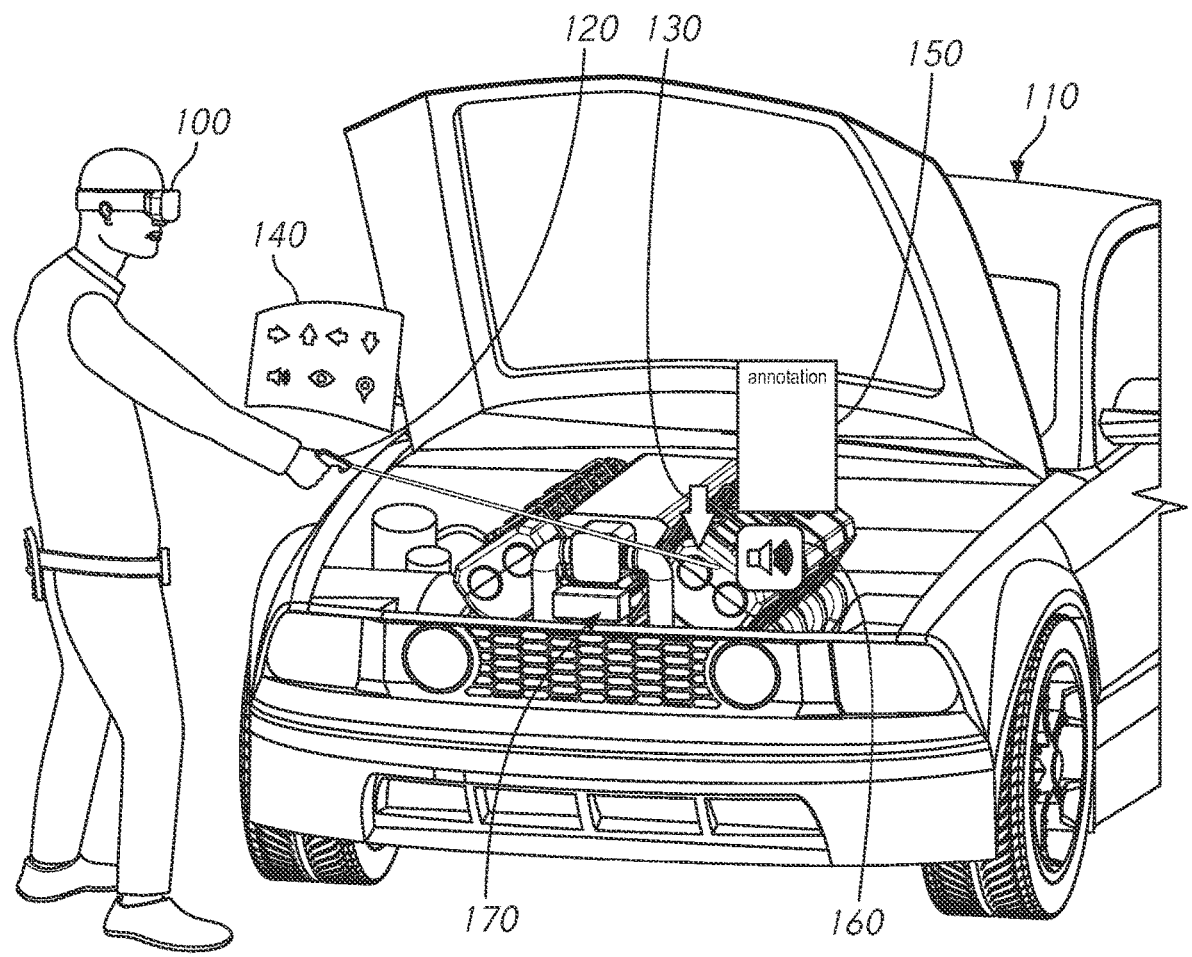
FIG. 4 is an illustration of a local user working with a machine while using an AR device according to embodiments.

Referring now to FIG. 4, a worker is shown performing maintenance on a vehicle (an example of a machine 110). The worker is wearing a device 100 while working on the vehicle. He hears noise coming from the engine compartment. He examines under the hood and locates the source of the noise, which is the serpentine belt 130 attached to the engine 170. He describes the issue in a virtually created digital note 150 in the form of a virtual memo using the wearable headset 100 and a hand-held controller 120 which may be in communication with the headset device 100.

In one or more embodiments, the aforementioned device 100 is operating in augmented reality, and may be in the form of wearable AR glasses, or in the form of a hand-held device such as a mobile phone or tablet. The device 100 may comprise one or more display modules which display a rendered image to the user, superimposed on top of the physical objects in the real-world environment. The device 100 comprises various sensors and/or modules including but not limited to camera and image sensors, depth sensor, accelerometers, gyroscopes, magnetometers, GPS sensors, barometer, Wi-Fi modules, Bluetooth modules, NFC modules, RFID modules, and light or Infrared modules. The device 100 may also comprise one or more user input modules including but not limited to hand and gesture sensors, microphone and microphone array for recognizing voice command, and one or more interactive controllers. Each interactive controller has either 3-DoF rotational tracking or 6-DoF positional and rotational tracking, and may comprise one or more touch pads, touch sensors, joy sticks, triggers and buttons.

The device 100 via a graphics engine is capable of displaying a rendered image of 2D and 3D elements to the user, superimposed on top of the physical objects in the real-world environment. The elements may display for example, text, drawings, a user interface (UI), a static picture, moving video, 2D shapes, a 3D model, and an animated sequence.

The device 100 via an audio engine is capable of reproducing an audio signal to the user, which may be monophonic, stereophonic or multichannel sound. The reproduced audio signal may vary based on the position and orientation of the user, generating a more immersive and convincing audio signal to the user.

The digital note 150 in FIG. 4 may be generated by selecting an option from a virtual menu 140 which draws a pointer from the hand-held controller 120 at the serpentine belt 130 and one of its pulleys. The user may dictate a brief description of the issue (for example, text input via speech recognition), along with a recorded audio clip 160 of the noise. The user triggers a command in the system to virtually attach the digital note 150 to the physical engine 170. However, he may not have step-by-step instructions available to service the engine.

Figure 5:
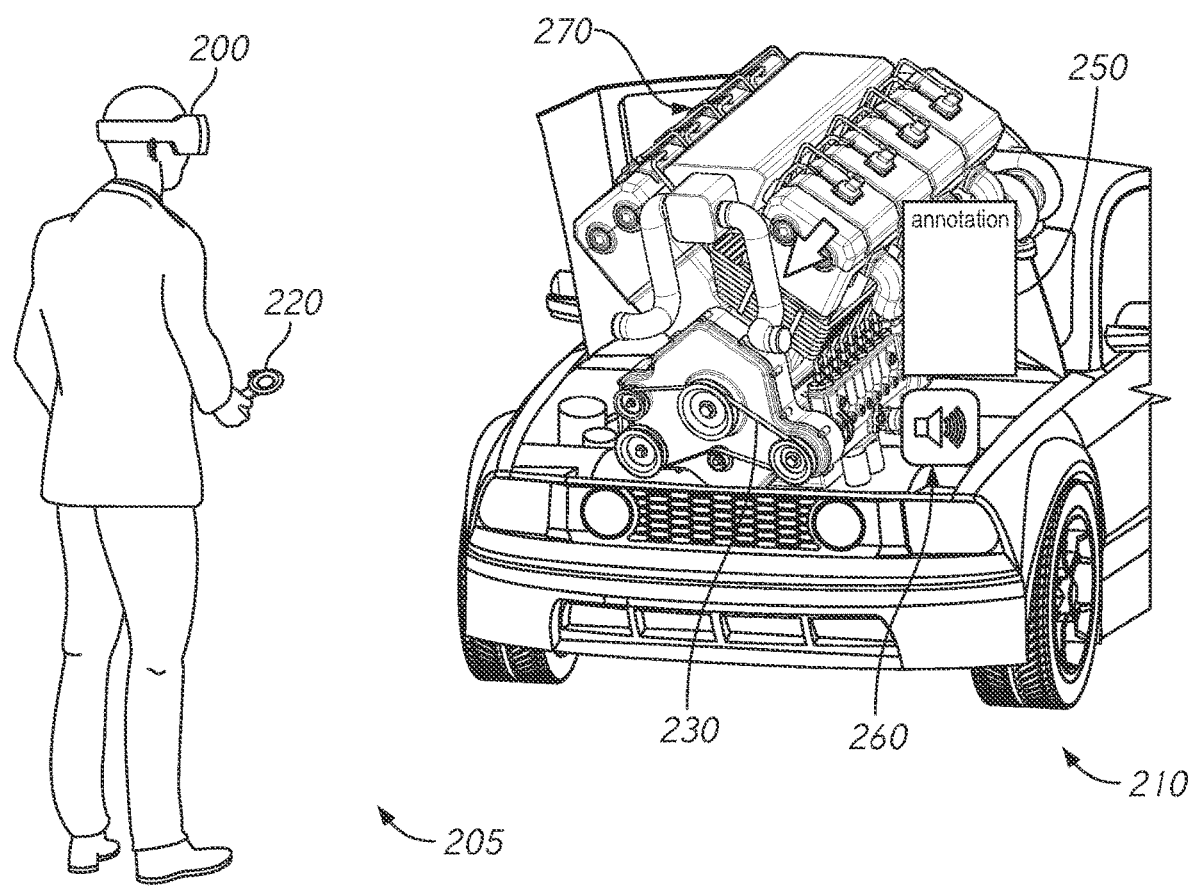
FIG. 5 is an illustration of a remote user seeing a digital twin of the machine of FIG. 4 through a remote virtual reality environment according to embodiments.
Figure 6:
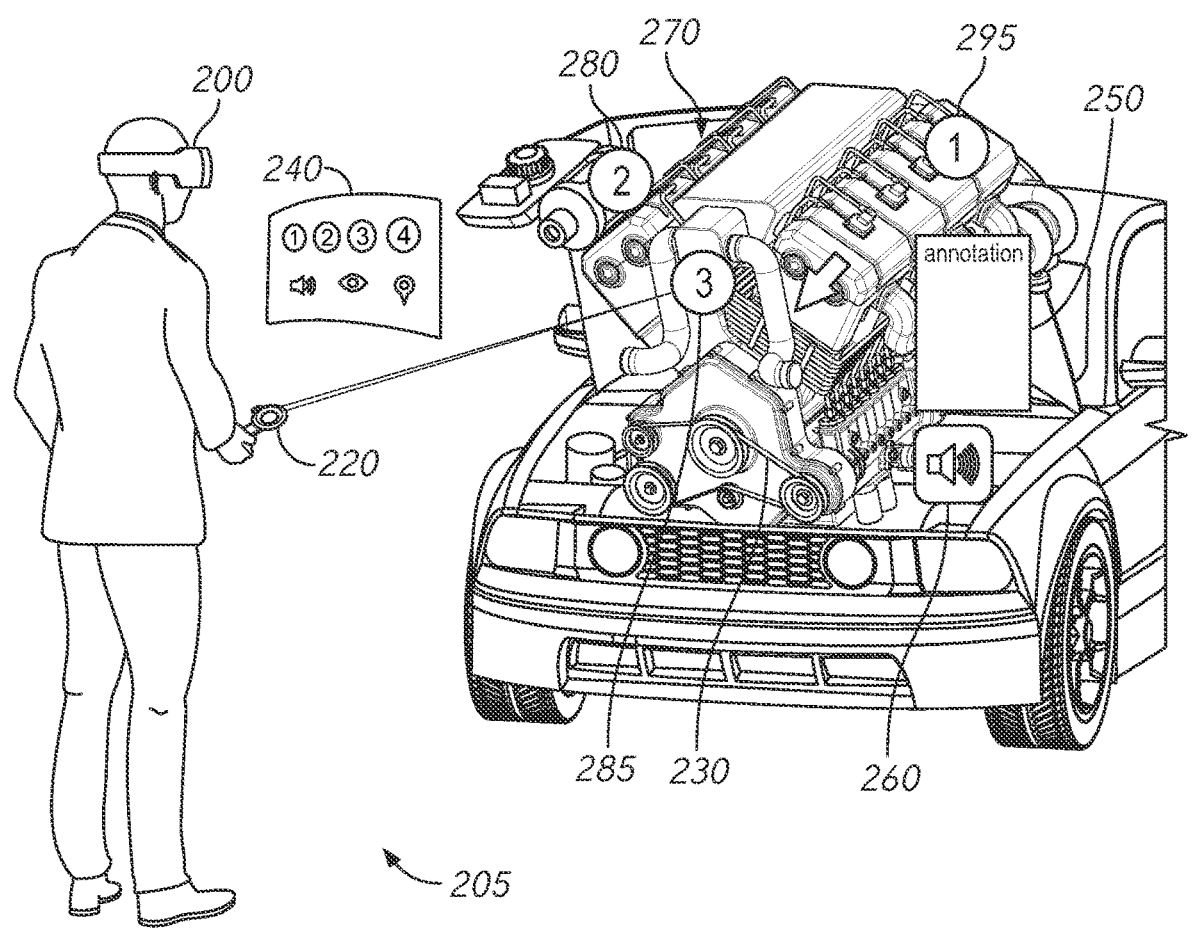
FIG. 6 is an illustration of the remote user of FIG. 5 attaching digital notes to the digital twin of the machine through a remote virtual reality environment according to embodiments.

Referring now to FIGS. 5 and 6, a scene shows a technical manager wearing a device 200 inside an office. The manager engages in a virtual reality session displaying a virtual reality scene 205 through the device 200. For ease of illustration, reference numerals in FIG. 5 use the same reference numerals used in FIG. 4 but use the "200" series of numbers to distinguish between elements in the AR environment of FIG. 4 and elements in the VR environment of FIG. 5. The manager sees a copy 250 of the synchronized digital note created by the worker shown in FIG. 4, superimposed on top of a digital twin 210 of the vehicle 110 inside the virtual environment 205. The digital note 150 may be automatically synchronized to a file of a digital twin 270 of the engine stored on the server 50. The digital twin 270 may be a virtual replica of the exact same engine 170 in the form of a 3D model which may also show a digital twin 230 of the serpentine belt 130. The 3D model may be created in advance, for example, by scanning with a 3D scanner the physical engine 170 under the hood. The 3D model may come from importing in advance a computer-aided design (CAD) model that may be available from the manufacturing/assembly process. The digital twin 270 of the engine may be labeled in advance to be associated to the physical engine 170 in the real-world environment to facilitate the automatic synchronization of the digital note 150 between the physical engine 170 and its digital twin 270. An icon 260 showing a copy of the audio file 160 stored with the physical serpentine belt 130 may be automatically displayed for the manager's attention. The manager may select features including for example the synchronized copy 250 of the digital note and the audio icon 260 through his own controller 220 and/or menu 240. By selecting either of the synchronized copy 250 of the digital note or the audio icon 260, a run-time file may be executed showing the text information, playing the audio data, and/or displaying a moving video image. The manager can now observe the same exact symptoms that the user at the physical vehicle 110 experiences by opening the digital note and listening to the accompanying audio file.

Figure 7:
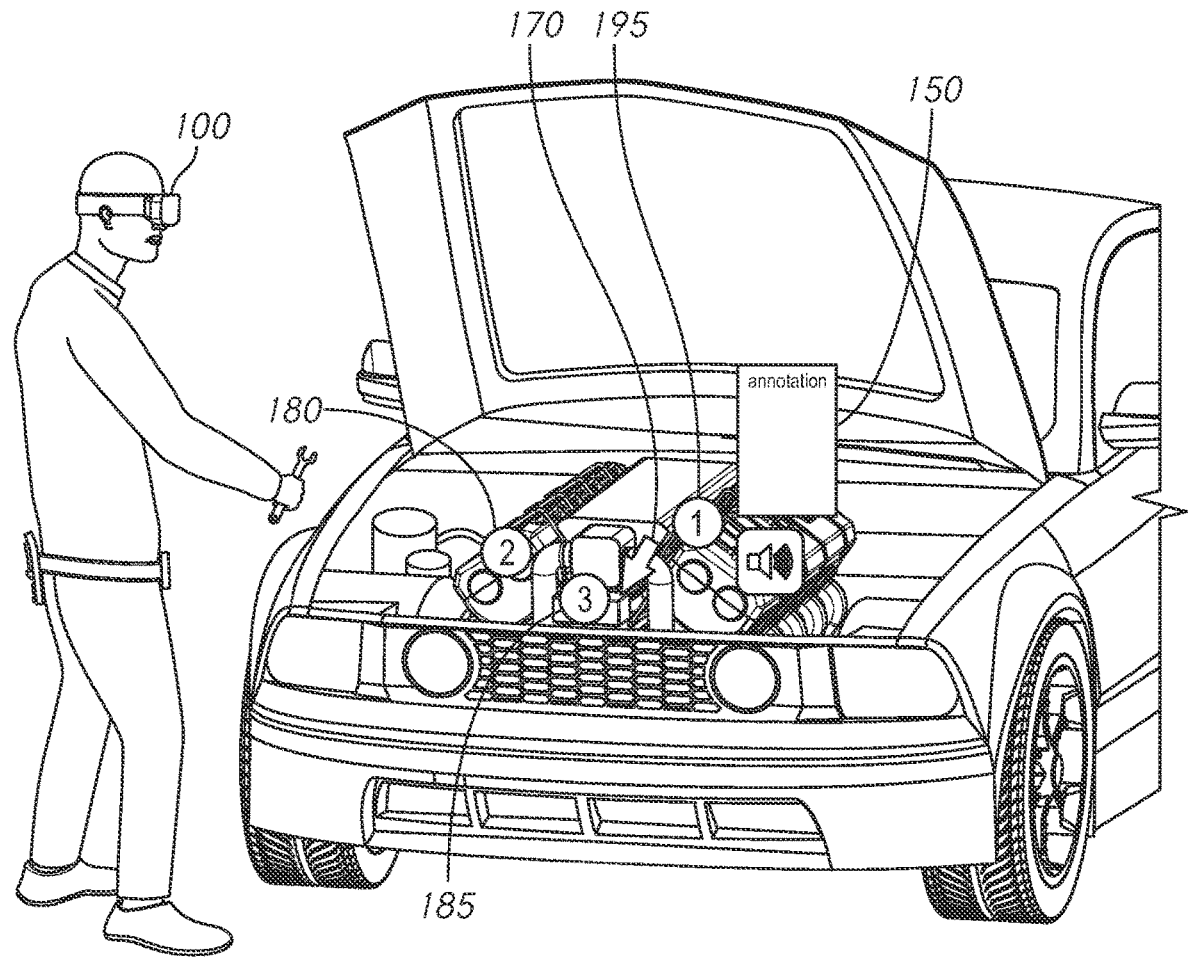
FIG. 7 is an illustration of the local user working with the machine of FIG. 4 seeing the digital notes attached by the remote user of FIG. 6 while using an AR device according to embodiments.

Some embodiments may include a feature to show a part of the machine 210 in an exploded view. For example, in FIG. 6, by enabling an exploded view, the manager clearly sees the disassembly of the digital twin of the engine parts 270 inside a fully immersive VR environment 205. The manager user may modify the copy 250 of the digital note that is attached to the digital twin. For example, the manager may add step-by-step instructions on how to fix the issue. In some embodiments, the digital note 250 may be configured to display markers 280, 285, and 295 in the VR environment 205, which show numbers representing steps in an order that the technician should access in sequence. The markers 280, 285, and 295 may be pointers showing the technician where to operate next as disclosed by the digital note. In some embodiments, the markers 280, 285, and 295 may be sub-digital notes which may include their own respective embedded information anchored to the points a user attaches them to. The manager modified version of the digital note may have its information automatically synchronized back to a file associated with the physical engine 170 in the real-world environment as shown in FIG. 7. The worker puts on his wearable device and sees the synchronized digital note superimposed on top of the physical engine in an AR environment. When the user selects the digital note 150, the modified information may be retrieved and becomes visible (or audible in the case of audio files) as a run-time file is executed. The note is automatically synchronized which includes the initial diagnosis from the worker, along with detailed step-by-step instructions from the manager. The markers 280, 285, and 295 may become visible to the user in the real-world as AR markers 180, 185, and 190. With this information at hand, the worker fixes the noise issue with ease. In such a way, the manager may communicate a task along with instructions in how to proceed to the technician.

Figure 6A:
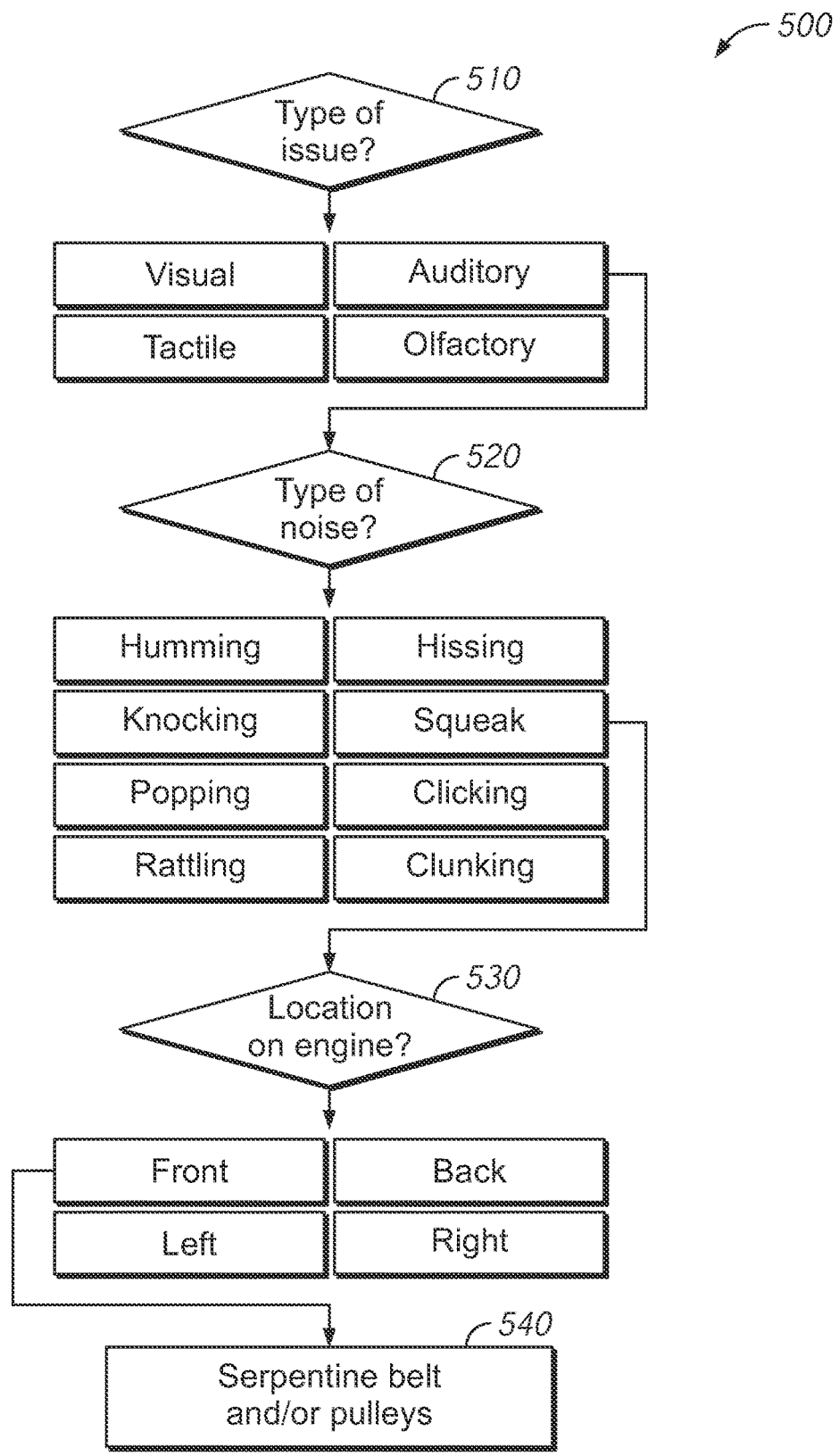
FIG. 6A is a flowchart of a method of identifying an issue through an artificial intelligence process according to exemplary embodiments.

Referring now to FIG. 6A, a process 500 of troubleshooting a machine using Artificial Intelligence (AI) is shown according to an exemplary embodiment. In some situations, the user at the machine may not be able to share a session with another user. In some machines, a digital note configured for troubleshooting may be attached to an element based on pre-stored information. The trouble shooting AI process for the element may be stored in a server and accessed when triggered by selecting a digital note that can be seen through an AR menu option for displaying digital notes. In some embodiments, the system may allow AI to automatically generate the content (in part or in full) which is then synchronized between virtual and real-world environments.

More specifically, the AI module may gather information from technical/service manuals of a target object (machine), and also from its digital twin (3D CAD model). The AI module may help a worker troubleshoot an issue by guiding the worker through a Expert System (ES) based series of questions and follow-up steps. The worker may point out an estimated location, or vicinity of the source of problem on the 3D model in VR, to narrow down the scope of search for the AI module. The AI module may interactively guide the worker to follow step by step instructions towards fixing the issue. These steps may change depending on worker's input.

Consider the following example use case where the AI module helps the worker troubleshoot the squeak noise coming from the engine.

The process may display a question that asks 510 the user to identify a baseline issue or symptom. In the use case of troubleshooting a car issue, the process asks to identify a symptom by the sensory type detecting the symptom (visual, auditory, tactile, olfactory). In response to the user selecting a sensory type, in this case, an auditory symptom, the process determines that a noise is present and follows up with a question 520 asking what type of noise is heard. The user may be provided with a plurality of examples from which to select from. After selection, the process may ask 530 for the location of the symptom. Based on a response by the user, the process may generate 540 a diagnosis. In the example, the process suggests that the symptom is associated with a serpentine belt or pulley.

Figure 6B:
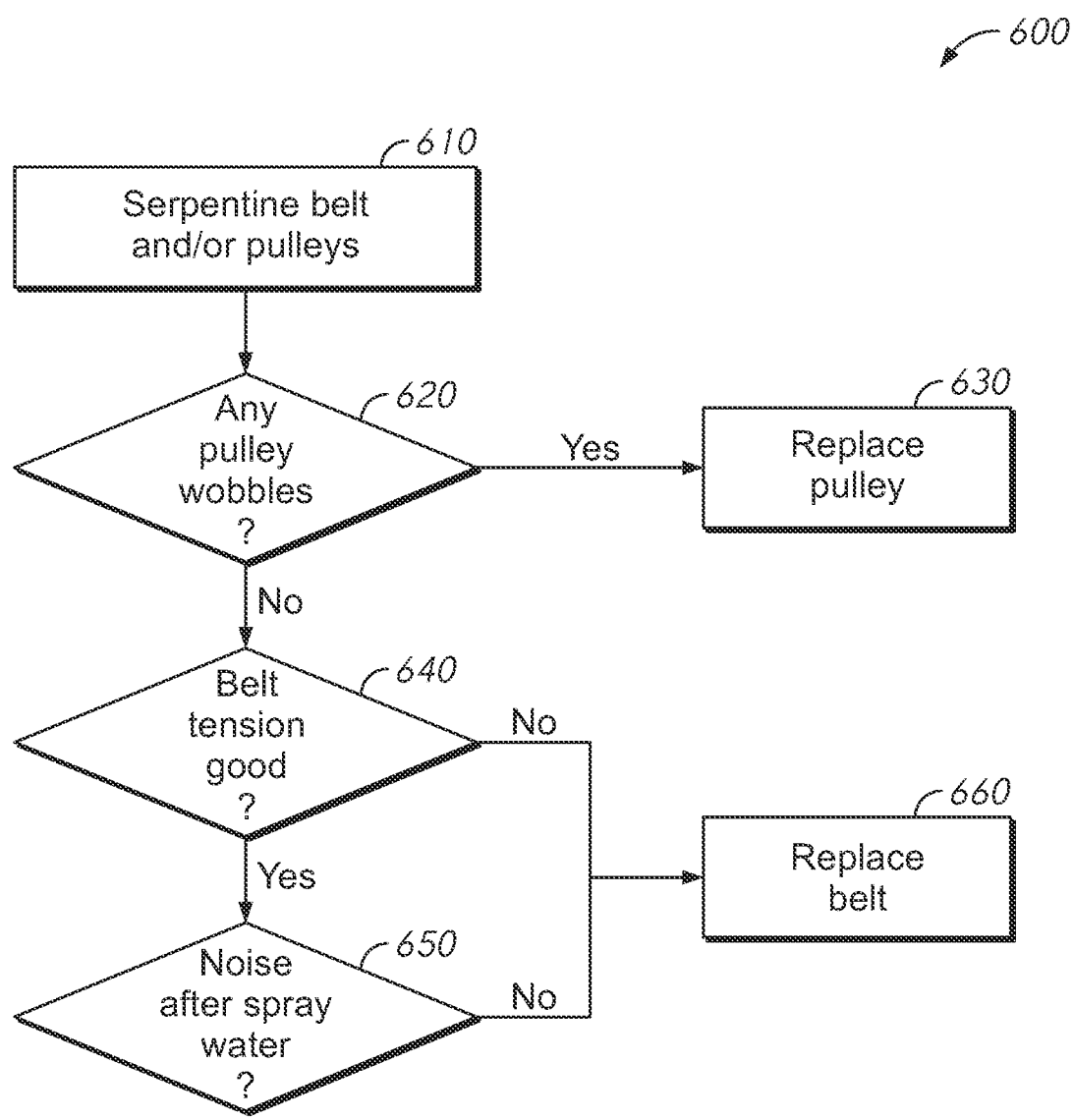
FIG. 6B is a flowchart of a method of troubleshooting an issue through an artificial intelligence process according to exemplary embodiments.

Referring now to FIG. 6B, a process 600 of generating an automatic set of instructions is shown according to an exemplary embodiment. The process 600 may in some embodiments, be generated based on the diagnosis generated from the process 500. As will be appreciated, the process 600 may be the basis for generating digital notes as steps such as the AR markers 180, 185, and 190 shown in FIG. 7. Each of the AR markers 180, 185, and 190 may represent a step in the process 600. For example, with a diagnosis 610 of the symptom coming from the serpentine belt or pulleys, AR marker 195 may represent a note that tells the user to check 620 for any pulley wobbles. If the user finds wobbling, an input back into the system indicating a wobble may generate a visual note to replace 630 the pulley. If there is not any wobbling present, the process may direct the user to AR marker 185 which ask 640 whether the belt tension is good. If the belt tension is not good, then the process may indicate that the belt should be replaced 660. Otherwise the user may proceed to selecting AR marker 180 which asks to check for noise after spraying the belt with water. If noise was not present, then the system may determine that the belt should still be replaced 660. While not shown, it should be understood that if the noise was still present after spraying, then the noise may originate from another source, in which case the system may prompt the user to try and identify the source of the symptom again by repeating the process 500.

Different embodiments may attach the digital information to a physical object or virtual object depending on the circumstance. To track attachment points of physical and virtual objects, objects and sometimes their environments are stored relative to a coordinate system so that their appearance is replicated in a virtual scene with consistency so that the digital information is tied to the same point in space that is the subject of study. Various approaches are discussed herein as examples that may be employed in the different embodiments.

Persistent Tracking

Figure 8:
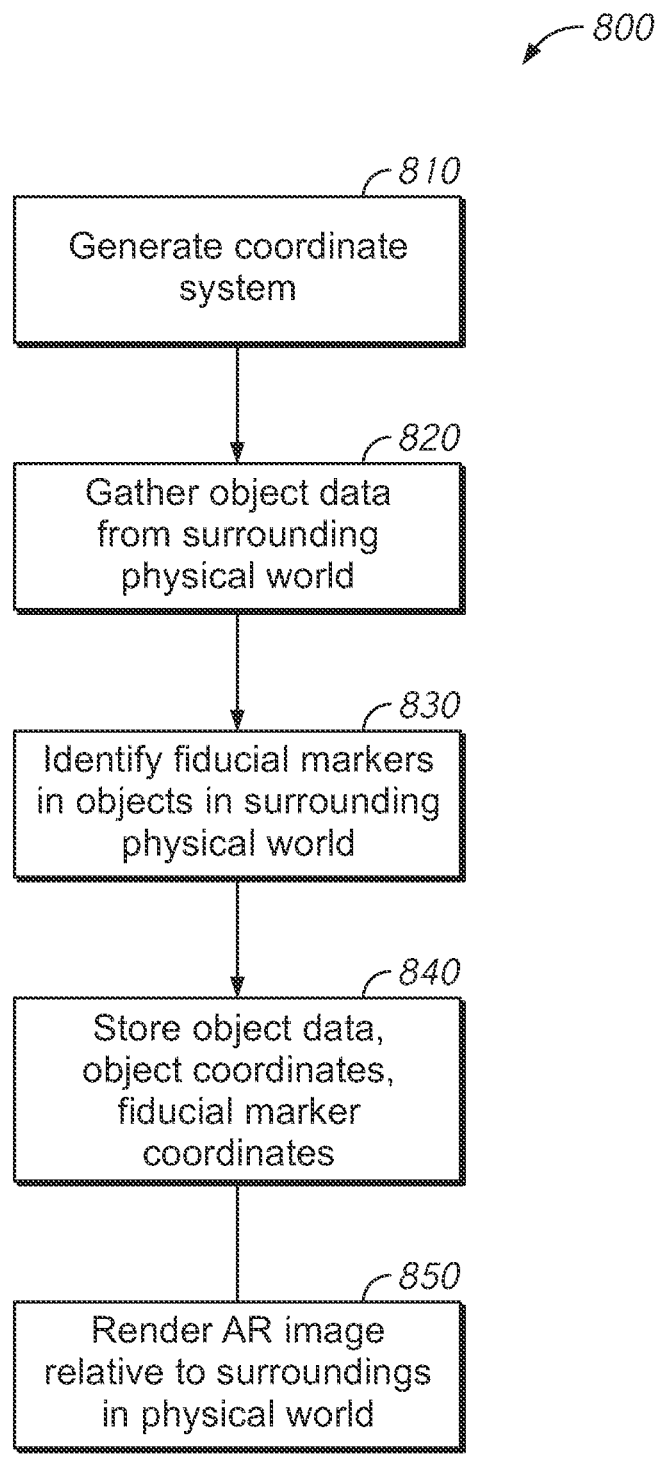
FIG. 8 is a flowchart of a method of rendering images using persistent tracking to generate anchor points for digital notes according to exemplary embodiments.

Referring now to FIG. 8, a method 800 of persistent object tracking is shown according to an exemplary embodiment. In one embodiment of the subject technology, the system provides robust real-time 6 Degrees-of-Freedom (6-DoF) tracking of the position and orientation of an AR device (for example, device 100) relative to the physical world. A coordinate system for the 6-DoF tracking is generated 810 by the system which relies on identified 830 fiducials (feature points) gathered 820 from the surroundings in the physical world via the camera and image sensors, and optionally the depth sensor, together with other sensor data such as GPS, Wi-Fi signals, Bluetooth signals, atmospheric pressure and magnetic field of the Earth that may be included in the device 100. The identified fiducial markers, object data, and object coordinates may be stored 840 in the server 50. The system employs the coordinate system to display 850 a rendered AR image having virtual objects positioned with respect to the coordinate system. From the user's perspective, the rendered AR image appears static relative to the surroundings in the physical world, regardless of the position and orientation of the user.

The system via a memory which communicates with the processor is capable of storing and retrieving the previously employed coordinate system from an earlier session. The system may store multiple previously employed coordinated systems from various earlier sessions, and retrieve the correct previously employed coordinate system based on the fiducials gathered within a particular section of the surroundings in the physical world. The system may rely on fiducials gathered from fiducial markers in the form of barcode or Quick Response code (QR code) to determine the correct coordinate system to be retrieved. The system may also rely on fiducials gathered from a particular object or objects chosen by the user to determine the correct coordinate system to be retrieved.

The system may establish wired or wireless communication to a data server 50 (FIG. 1) or remote cloud storage to send or write data or a file object. The system is then capable of remotely storing and remotely retrieving from the server the previously employed coordinate system from an earlier session.

Combined with the graphics engine, the system is capable of displaying a rendered image that remains fixed relative to the surroundings in the physical world to the user, superimposed on top of the physical objects in the real-world environment.

Target Object Tracking

Figure 9:
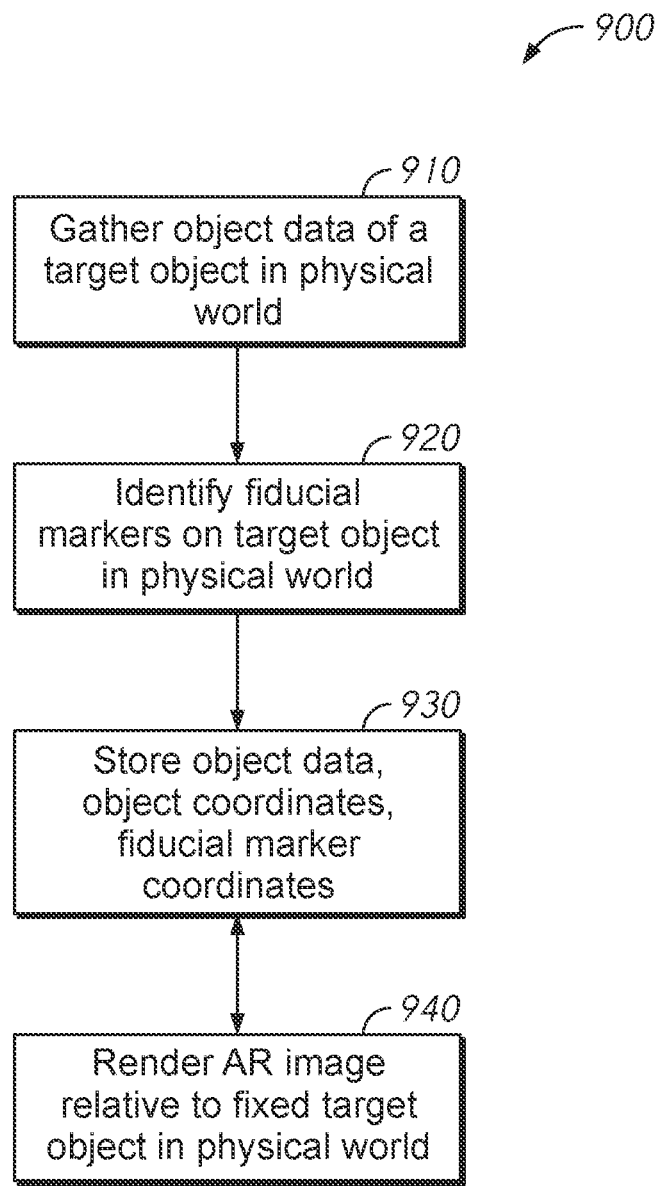
FIG. 9 is a flowchart of a method of rendering images using target object tracking to generate anchor points for digital notes according to exemplary embodiments.

Referring now to FIG. 9, a method 900 of target object tracking is shown according to an exemplary embodiment. The system provides robust real-time 6 Degrees-of-Freedom (6-DoF) tracking of the position and orientation of the AR device relative to a particular object (target object) in the physical world. A coordinate system for the 6-DoF tracking is generated by the system which relies on fiducials (feature points) gathered 910 from a target object in the physical world via the camera and image sensors, and optionally the depth sensor, together with other sensor data such as GPS, Wi-Fi signals, Bluetooth signals, atmospheric pressure and magnetic field of the Earth. The fiducial points may be identified 920 on the target object. The object data, object coordinates, and fiducial marker coordinates may be stored 930. The system employs the coordinate system to display 940 a rendered AR image having virtual objects positioned with respect to the coordinate system relative to the target object.

The system is capable of storing and retrieving the previously employed coordinate system from an earlier session by storing and retrieving the fiducials (feature points) gathered from a particular target object in the physical world. This process may be done either with a memory module on the device, or via communication to a data server or remote cloud storage.

Combined with the graphics engine, the system is capable of displaying a rendered image that remains fixed relative to the target object in the physical world to the user, superimposed on top of the target object in the real-world environment. If the target object in the physical environment moves, the rendered AR image will similarly move. From the user's perspective, the rendered AR image appears always fixed to the target object in the physical world, regardless of the position and orientation of the user.

Digital Twin

In some embodiments, it may be helpful for a user to have access to a digital twin of an object. The system via the camera and image sensors, and optionally the depth sensor, is configured to scan and recreate a digital replica (digital twin) of a physical object in the real-world environment. The digital twin is stored as an electronic file, for example, in the server 50 to be called when requested. A user inside the real-world environment may employ a 3D scanner to scan and recreate a digital replica (digital twin) of a physical object in the real-world environment. The user inside the real-world environment may employ a 3D modeling software to model and recreate a digital replica (digital twin) of a physical object in the real-world environment. In some embodiments, the user inside the real-world environment may import a computer-aided design (CAD) model that is already available from the manufacturing/assembly process and recreate a digital replica (digital twin) of a physical object in the real-world environment. The user inside the real-world environment may use a hybrid approach combining the aforementioned methods to recreate a digital replica (digital twin) of a physical object in the real-world environment.

The digital twin may be stored and retrieved either with a memory module on the device, or via communication to a data server or remote cloud storage.

Inside a VR or AR environment, an interface may be employed for the user to browse, edit and program the previously stored digital twin. The interface may provide a way for the user to associate a physical object in the real-world environment with its digital twin. The digital twin may be labeled to be associated to the physical object in the real-world environment.

Attaching Information

The user via an interface may create and then attach a digital note carrying a piece of information that is associated with the surroundings in the physical world, including a physical target object in the real-world environment.

Some embodiments may use a loose coupling. The attached digital note may be loosely coupled to a target object in the real-world environment, with the assumption of the target object remaining relatively static in the environment. The coupling may rely on being associated with fiducials (feature points) gathered from the surroundings in the physical world via the camera and image sensors, and optionally the depth sensor, together with other sensor data such as GPS, Wi-Fi signals, Bluetooth signals, atmospheric pressure and magnetic field of the Earth. The loose coupling is designed so that the digital note may be anchored roughly in place to the object as a whole, allowing small changes in the target object position, orientation and deformation, and also allowing partial disassembly of the target object. For example, the user may open a large service door on the front of a machine and pull out a control panel, which may easily confuse the traditional tracking algorithm because a large portion of the target object has changed. With loose coupling, the system may rely more on fiducials gathered from the surroundings in the physical world, making the digital note anchored relatively in place.

In some embodiments, the attachment may be a tight coupling. The user via an interface is capable of creating and then attaching a digital note carrying a piece of information that is directly associated to a physical target object or a particular section on the object in the real-world environment. The attached digital note may be tightly coupled to a target object in the real-world environment. The coupling may rely on fiducials (feature points) gathered from a particular section of the physical target object via the camera and image sensors, and optionally the depth sensor. The user via an interface in the device is capable of creating and then attaching a digital note carrying a piece of information that is directly associated to a virtual target object inside a Virtual Reality or Augmented Reality environment. The digital note is automatically synchronized with the physical target object that is associated with the virtual target object. Thus, the digital note in turn is directly attached to the physical target object in the real-world environment when the physical target object is viewed through an AR scene. If the target object moves, the digital note may also move, closely following the target object. Changes in the real-world environment around the physical target object may not affect the tight coupling between the target object and the associated digital note.

Store, Retrieve & Synchronization

A digital note may be stored and retrieved either with a memory module on the device, or via communication to a data server or remote cloud storage. A digital note may be automatically synchronized between the machine in the physical world and its digital twin in the virtual environment.

Such a digital note may be created, modified or deleted by a user. All representations of the same digital note (for example, a version attached to a physical object, a version attached to a digital twin, and a version attached to an AR or VR version of the object) may be updated in a synchronous fashion if a user creates, modifies or deletes one version of the digital note. Two or more users may be shown different representations of the same digital note. Each user may be shown an identical representation of a digital note that is associated to the same target object, with modifications to the digital note automatically synchronized among all representations of the digital notes for all users. Each user may be shown to a customized representation of a digital note that is associated to the same target object. The customized representation of a digital note may consist identical content that is automatically synchronized among all users, along with personalized content that is only accessible to a particular user.

If a user first creates a digital note attached to a machine in the physical world, such digital note may be retrieved and synchronized so that from the perspective of a user, the digital note is shown virtually attached to the digital twin of the machine in a virtual environment.

Such a process may be reversed. If a user first creates a digital note attached to a machine in the virtual environment, then such digital note may be retrieved and synchronized so that from the perspective of a user, the digital note is shown virtually attached to the physical machine (physical twin) in the physical world through for example, an AR environment.

In addition, another embodiment may include a first user attaching a digital note to a physical object when engaged in an augmented reality setting. The system may store the location of the digital note on the physical object. When the same or another user is looking at another instance of the physical object in a new (or separate simultaneously occurring) augmented reality session (for example, another of the same type car and engine), some embodiments may identify the fiducial marker(s) that correspond to the same location of the original engine to which a digital note was attached, and may generate a copy of the digital note attached to the original engine for attachment to the current engine. The information from the original digital note may be synchronized to the new instance of the digital note to be shown in the new augmented reality session. In this aspect, the original digital note may not necessarily be attached to an intervening digital replica of the original engine and may instead be synchronized upon creation in the second augmented reality session when the system determines where the note should be anchored in the second instance of the engine.

As will be appreciated, aspects of the disclosed technology may be used in other ways. The following includes additional applications of the subject technology.

Figure 10:
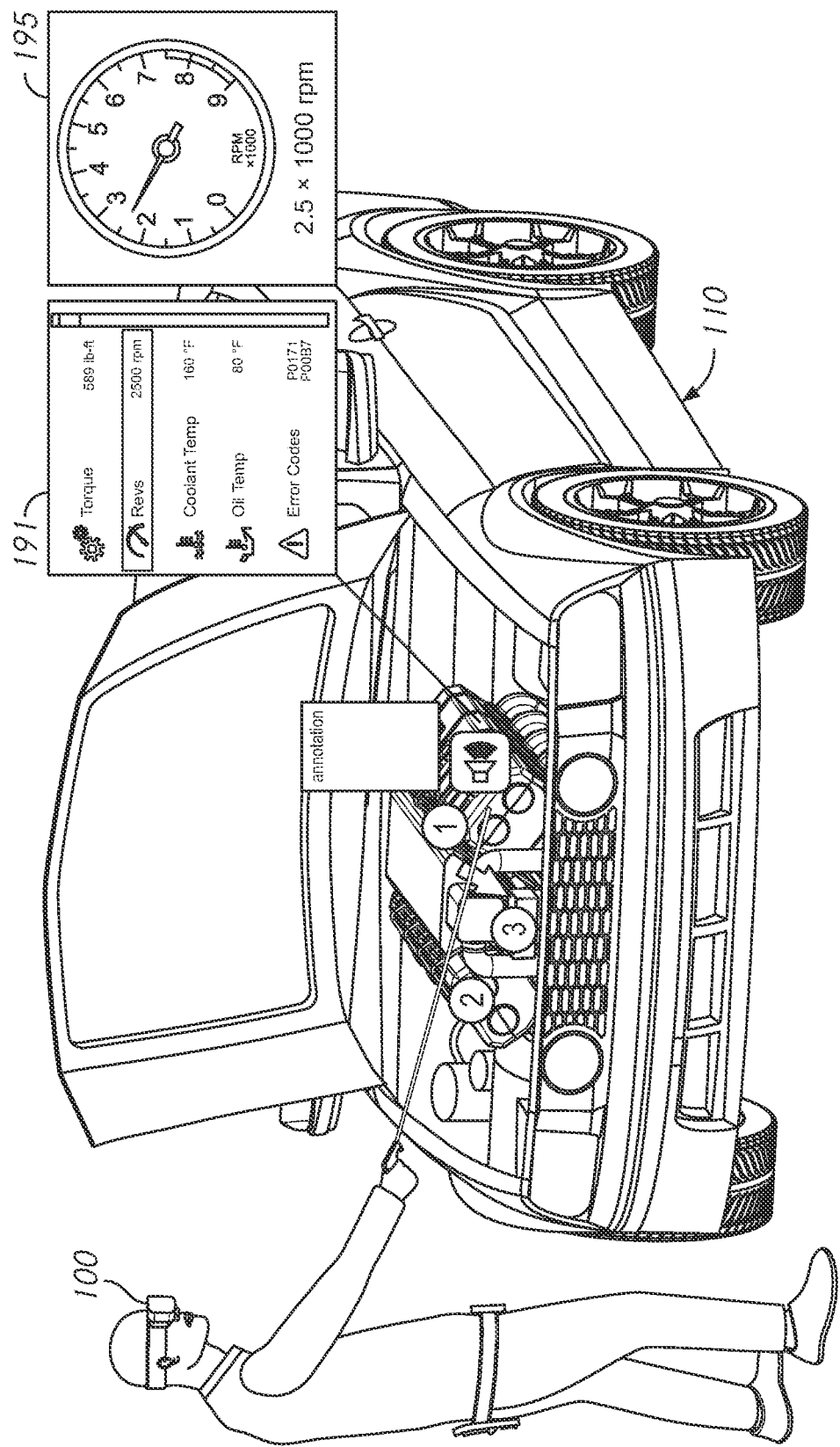
FIG. 10 is an illustration of the local user working with the machine of FIG. 4 seeing pop-up information from a connection to an on-board controller of the machine, displayed through the AR device according to embodiments.

Referring now to FIG. 10, another scenario is illustrated. The drawing illustrates a digital note overlaying on top of the physical vehicle. In this embodiment, the digital node contains dynamic information that is wirelessly streamed from the On-Board Diagnostic (OBD) system of the vehicle engine, showing the worker real-time readings 191 to help with the diagnosis, including torque, engine speed 195, temperatures, error codes, etc. The OBD may be an example of a controller 199 shown in FIG. 2.

Digital notes may contain dynamic information from various sources. For example, a worker may create a digital note 150 attached to a physical turbine which displays the temperatures and shaft speed dynamically acquired from an Internet of Things (IoT) sensor network. Digital notes may combine static information with dynamic information. For example, the worker may add a piece of drawing to the IoT data in order to highlight an abnormality. Digital notes may contain dynamic information that is modified or overridden by a user. For example, the worker may manually modify or override the IoT sensor data in order to correct readings from a failed IoT sensor.

Figure 11:
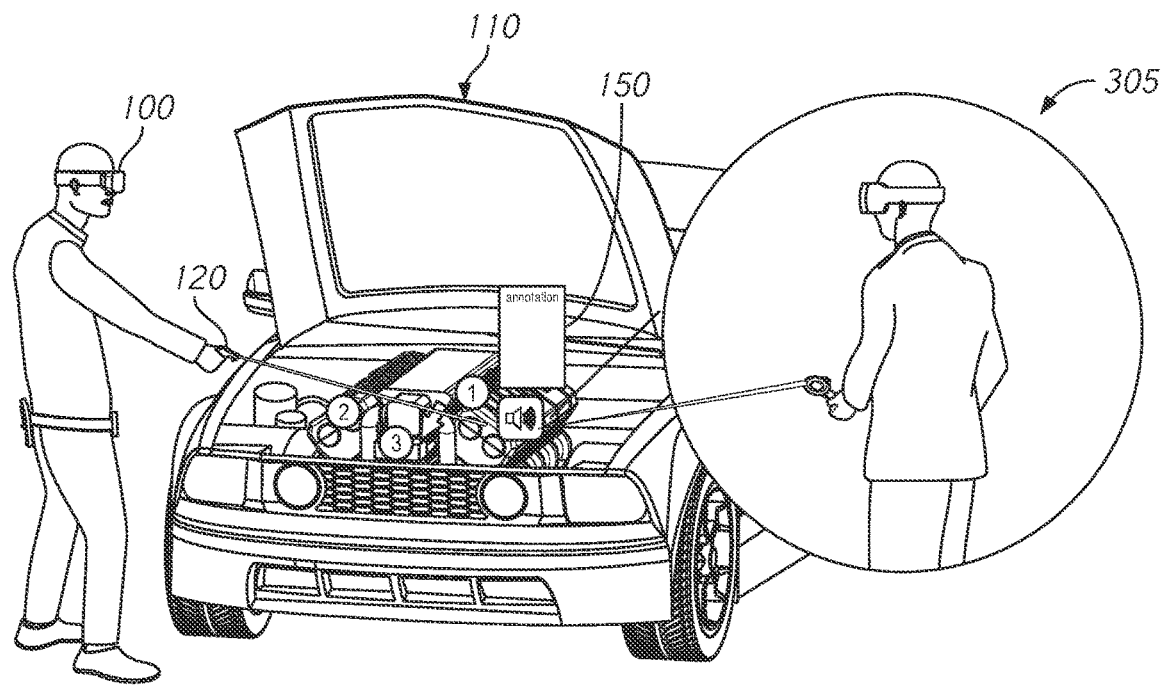
FIGS. 11 and 12 are illustrations of a shared virtual session with each user seeing an avatar of the other user engaging simultaneously with the machine through respective AR/VR environments according to exemplary embodiments.
Figure 12:
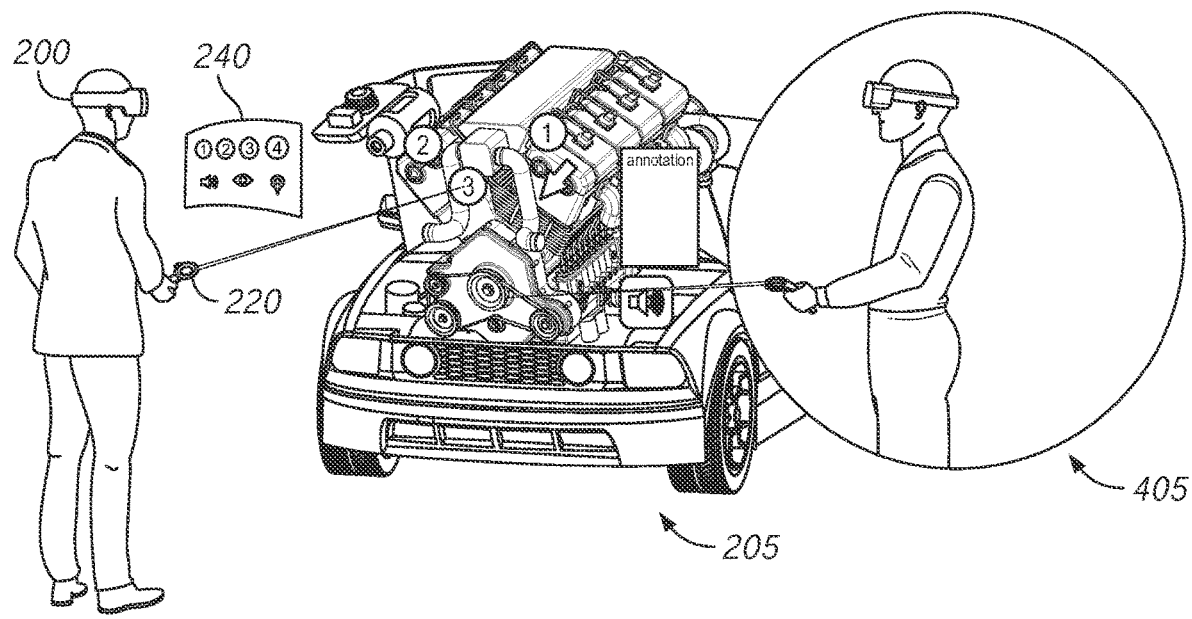

Referring now to FIGS. 11 and 12, in a different embodiment, two users participate in a shared session. Both users are using devices (100; 200) running the system disclosed above. In FIG. 11, user A may be present in front of a physical engine, while user B is immersed inside a virtual environment containing the digital twin of the same engine. User A may see, within an AR setting displayed in his device 100, a virtual avatar 305 of user B indicating the position and orientation of user B in real-time, while user B sees a virtual avatar 405 of user A in real-time in FIG. 12. From each other's perspective, both user A and user B may appear to be looking at the same object within their respective devices while simultaneously seeing the other's avatar. User A may also see a laser shooting out from user B's virtual avatar in real-time, indicating the gaze or pointing direction of user B. A digital note may be created by user A and attached to the physical engine, while user B sees an automatically synchronized digital note attached to the digital twin of the same engine. User B may modify the digital note created by user A, and the modified digital note is automatically synchronized between user B and user A.

The shared session may be recorded and replayed at a later time for another user. For example, user C with a wearable device may see a playback of the session that contains user A, user B, and the digital notes they had previously created.

Figure 13:
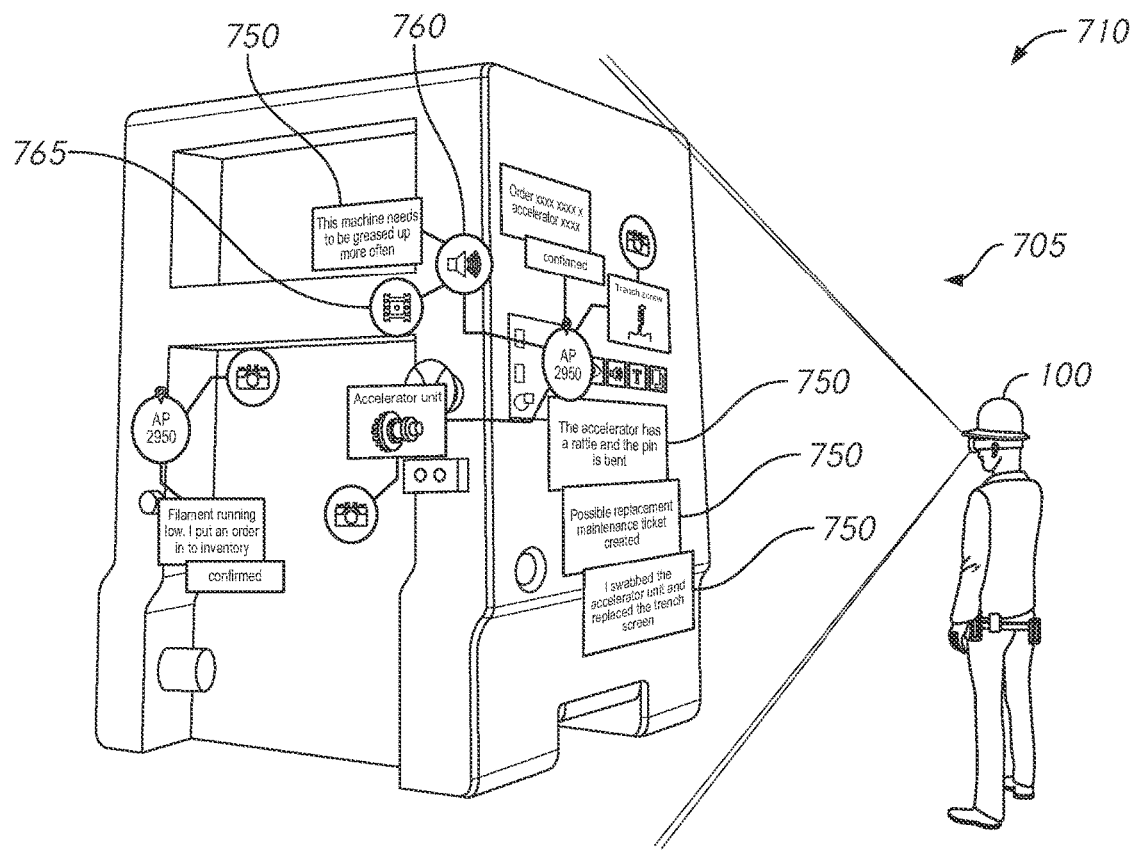
FIG. 13 is an illustration of a user working with a machine that has digital notes attached to the machine when seen through an AR device according to embodiments.

Referring now to FIG. 13, aspects of the subject technology are shown according to another embodiment. A user is shown that will operate, fix or train on the use of a machine 710. The machine 710 is a physical machine and the user looks at the machine through the device 100 configured to generate an AR environment 705 that displays digital images superimposed onto the machine 710. As will be understood, the digital images are attached to the machine 710 by using one of the coordinate generating techniques described above. For example, if the machine 710 is one that remains mostly in a static location, the position of the digital notes attached to the machine may be stored according to a persistent tracking process. The user sees various types of information attached to a physical machine 710 through the AR view. For example, multiple digital text-based notes 750 are attached to the machine at different points. Other notes may include an audio-based note 760 and a video-based note 765. As may be appreciated, the audio-based note 760 and the video-based note 765 may be tied to a particular digital text-based note 750 so that the user may read about an element of the machine, hear an issue or what operation of that element should sound like, and see the element in motion (or what the author of the note meant by the description attached to the element). As can be seen, digital notes attached to a machine provide crucial information that is valuable beyond a shared session. The digital notes may provide a trail of information that a user can access for a particular point on a machine at the time of engagement.

Figure 14:
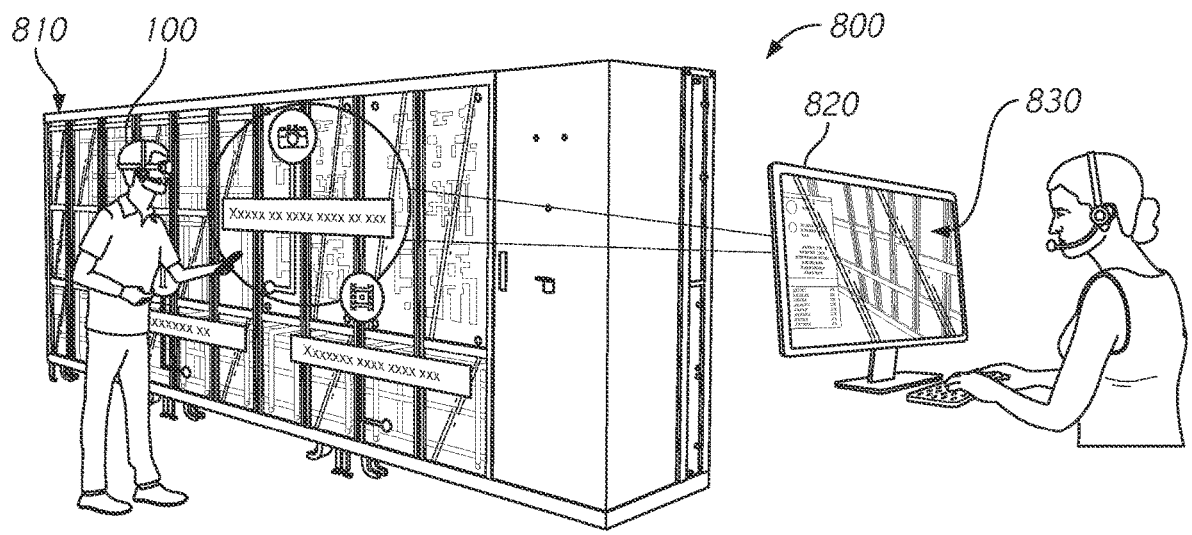
FIG. 14 is an illustration of a shared virtual session with a field worker receiving remote assistance through an AR configured headset from a second user through a desktop computer using a local software application according to exemplary embodiments.

Referring now to FIG. 14, another aspect of the subject technology is shown according to another embodiment. A remote assistance session 800 is shown that includes a user donning a device 100. A field worker equipped with an AR headset 100 is working on a complex machine system 810. The field worker is receiving assistance remotely from a manager that is providing guidance through a desktop computer 820. In one embodiment, the AR scene visible to the field worker is visible to the manager through a user interface which generates a remote AR view replicating what is actually seen by the field worker, in the manager's desktop computer 820. The manager may point to locations on the machine, attach digital notes, and generate audio commands that the field worker can see displayed simultaneously through his AR view in real-time.

Figure 15:
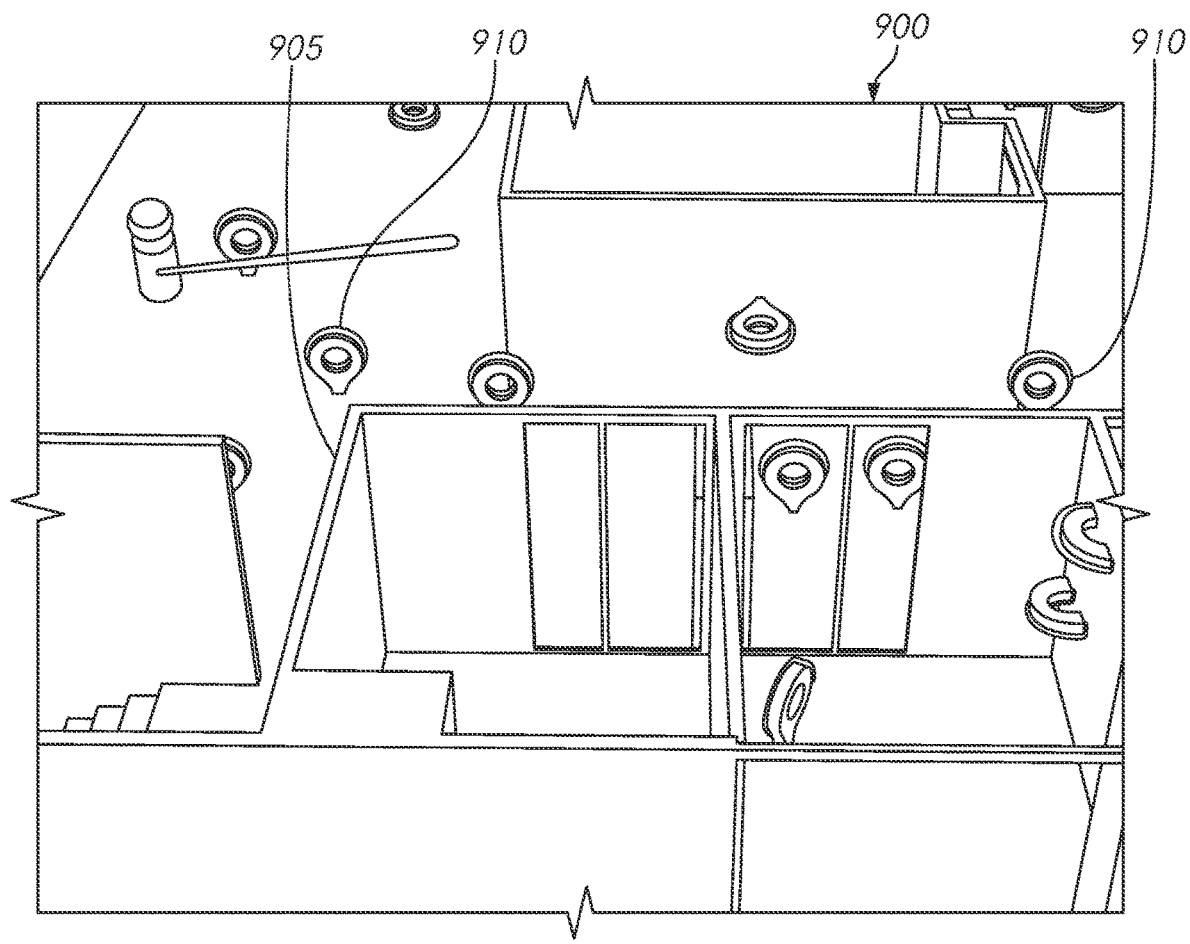
FIG. 15 is a screenshot of a virtual floorplan with user placed anchor points according to exemplary embodiments.

Referring now to FIG. 15, a screenshot 900 of an AR-Assist application is shown according to an embodiment. The screenshot shows a virtual floor plan that may be for example, an office space. A plurality of walls define cubicles 905. In the office space, virtual anchors 910 were placed all around the floor plan. Each anchor may represent a point that receive a digital note or may be an icon representing the presence of a digital note. User can drop anchors 910 either directly in the physical office building while using an AR headset and walking through the floor plan, or in a digital twin of the office building within a VR application running inside a web browser.

As will be appreciated by one skilled in the art, aspects of the disclosed embodiments may be embodied as a system, method or process, or computer program product. Accordingly, aspects of the disclosed invention may take the form of an entirely hardware embodiment, an entirely software embodiment (including firmware, resident software, microcode, etc.) or an embodiment combining software and hardware aspects that may all generally be referred to herein as a "circuit," "module," or "system." Furthermore, aspects of the disclosed invention may take the form of a computer program product embodied in one or more computer readable media having computer readable program code embodied thereon.

Any combination of one or more computer readable media may be utilized. In the context of this disclosure, a computer readable storage medium may be any tangible or non-transitory medium that can contain, or store a program for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing.

Aspects of the disclosed invention are described above with reference to block diagrams of methods, apparatus (systems) and computer program products according to embodiments of the invention. It will be understood that each block of the block diagrams, and combinations of blocks in the flowchart illustrations and/or block diagrams, can be implemented by computer program instructions. These computer program instructions may be provided to the processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

In some embodiments, a computer program product may be stored on a variety of computer system readable media. Such media could be chosen from any available media that is accessible by the processor, including non-transitory, volatile and non-volatile media, removable and non-removable media. Some embodiments may include system memory integrated into the PCB carrying the processor, which could include one or more computer system readable media in the form of volatile memory, such as a random-access memory (RAM) and/or a cache memory. The system memory may include at least one program product having a set (e.g., at least one) of program modules that are configured to carry out the functions of embodiments disclosed above. The program modules generally carry out the functions and/or methodologies of embodiments.

Although the invention has been discussed with reference to specific embodiments, it is apparent and should be understood that the concept can be otherwise embodied to achieve the advantages discussed. The preferred embodiments above have been described primarily as immersive virtual reality systems and methods for a larger number of concurrent users. In this regard, the foregoing descriptions of the virtual reality environments are presented for purposes of illustration and description. Furthermore, the description is not intended to limit the invention to the form disclosed herein. Accordingly, variants and modifications consistent with the following teachings, skill, and knowledge of the relevant art, are within the scope of the present invention. The embodiments described herein are further intended to explain modes known for practicing the invention disclosed herewith and to enable others skilled in the art to utilize the invention in equivalent, or alternative embodiments and with various modifications considered necessary by the particular application(s) or use(s) of the present invention.

What is claimed is:

1. A method of synchronizing information of an object for user in virtual environments, comprising:
    receiving by a processor, image data of a physical object pointed to by a first user, viewed through an augmented reality scene;
    identifying a point on the physical object pointed to by the first user;
    receiving by the processor, digital information input by the user, wherein the digital information is associated with the physical object;
    associating the received digital information with the point on the physical object tin a stored file associated with the physical object;
    generating an icon displayed to represent the digital information;
    displaying the icon as attached to the physical object in the augmented reality scene;
    receiving image data of a virtual instance of the physical object in a virtual reality environment, viewed by a second user in the virtual reality environment, wherein the physical object is viewed by the first user in the augmented reality scene contemporaneously with the second user viewing the virtual instance of the physical object in the virtual reality environment;
    identifying a location on the virtual instance of the physical object corresponding to the point on the physical object;
    attaching an anchor to the identified location on the virtual instance of the physical object corresponding to the point on the physical object, wherein the identified location for the anchor is based on identifying fiducial markers surrounding the identified location and the anchor is attached in place relative to the surrounding fiducial markers;
    synchronizing the received digital information associated with the physical object to the anchor attached to the virtual instance of the physical object;
    attaching the icon to the anchor;
    attaching the synchronized received digital information to the icon;
    synchronizing access to the attached synchronized digital information in the icon for simultaneous access between the virtual reality environment and the augmented reality scene;
    displaying the icon in the virtual reality environment contemporaneously with the display of the icon in the augmented reality scene;
    retrieving the digital information attached to the icon from the stored file in response to a user selection of the icon; and
    displaying the retrieved digital information in the augmented reality scene contemporaneously with a display of the retrieved information in the virtual reality environment.

2. The method of claim 1, further comprising:
    receiving a user selection of the icon while the user is operating in the augmented reality scene;
    retrieving the digital information associated with the point on the physical object from the stored file in response to the received user selection of the icon; and
    triggering a run-time file execution disclosing the digital information in the augmented reality scene for the user.

3. The method of claim 1, wherein the virtual instance of the object is an exact digital replica of the physical object, the method further comprising:
- retrieving a stored file of the exact digital replica of the physical object;
- identifying a location on the exact digital replica of the physical object corresponding to the point on the physical object;
- attaching the anchor to the location on the exact digital replica of the physical object corresponding to the point on the physical object; and
- synchronizing the received digital information associated with the physical object to the anchor attached to the exact digital replica.

4. The method of claim 1, wherein the point on the physical object is a fiducial marker.

5. The method of claim 4, further comprising:
- displaying a second icon representing the digital information on the digital replica of the physical object at the anchor.

6. The method of claim 1, further comprising:
- receiving a selection of the icon from either the user or the second party in their respective augmented reality scene and virtual reality setting;
- retrieving the digital information from the stored file in response to the received selection of the icon; and
- triggering a run-time file execution displaying the digital information simultaneously in the augmented reality scene and the virtual reality setting, wherein the run-time file includes playback of one of a video or audio file.

7. The method of claim 1, further comprising:
- triggering a trouble-shooting process, in response to selection of the icon, disclosed to the user in the augmented reality scene, wherein the trouble-shooting process is based on the digital information associated with the physical object.

8. A computer program product for synchronizing information of an object for use in virtual reality environments, the computer program product comprising a non-transitory computer readable storage medium having computer readable program code embodied therewith, the computer readable program code being configured to:
- receive by a processor, image data of a physical object pointed to by a first user viewed through an augmented reality scene;
- identify a point on the physical object pointed to by the first user;
- receive by the processor, digital information input by the user, wherein the digital information is associated with the physical object;
- associate the received digital information with the point on the physical object in a stored file associated with the physical object;
- generate an icon displayed to represent the digital information;
- display the icon as attached to the physical object in the augmented reality scene;
- receive image data of a virtual instance of the physical object in a virtual reality environment, viewed by a second user in the virtual reality environment, wherein the physical object is viewed by the first user in the augmented reality scene contemporaneously with the second user viewing the virtual instance of the physical object in the virtual reality environment;
- identify a location on the virtual instance of the physical object corresponding to the point on the physical object;
- attach an anchor to the identified location on the virtual instance of the physical object corresponding to the point on the physical object, wherein the identified location for the anchor is based on identifying fiducial markers surrounding the identified location and the anchor is attached in place relative to the surrounding fiducial markers;
- synchronize the received digital information associated with the physical object to the anchor attached to the virtual instance of the physical object;
- attach the icon to the anchor;
- attach the synchronized received digital information to the icon;
- synchronize access to the attached synchronized digital information in the icon for simultaneous access between the virtual reality environment and the augmented reality scene;
- display the icon in the virtual reality environment contemporaneously with the display of the icon in the augmented reality scene;
- retrieve the digital information attached to the icon from the stored file in response to a user selection of the icon; and
- display the retrieved digital information in the augmented reality scene contemporaneously with a display of the retrieved information in the virtual reality environment.

9. The computer program product of claim 8, wherein the computer readable program code is configured to:
- receive a user selection of the icon while the user is operating in the augmented reality scene;
- retrieve the digital information associated with the point on the physical object from the stored file in response to the received user selection of the icon; and
- trigger a run-time file execution disclosing the digital information in the augmented reality scene for the user.

10. The computer program product of claim 8, wherein the virtual instance of the object is an exact digital replica of the physical object and the computer readable program code is configured to:
- retrieve a stored file of the exact digital replica of the physical object;
- identify a location on the exact digital replica of the physical object corresponding to the point on the physical object;
- attach the anchor to the location on the digital replica of the physical object corresponding to the point on the physical object; and
- synchronize the received digital information associated with the physical object to the anchor attached to the exact digital replica.

11. The computer program product of claim 8, wherein the point on the physical object is a fiducial marker.

12. The computer program product of claim 10, wherein the computer readable program code is configured to:
- display a second icon representing the digital information on the digital replica of the physical object at the anchor.

13. The computer program product of claim 8, wherein the computer readable program code is configured to:
- receive a selection of the icon from either the user or the second party in their respective augmented reality scene and virtual reality setting;
- retrieve the digital information from the stored file in response to the received selection of the icon; and trigger a run-time file execution displaying the digital information simultaneously in the augmented reality scene and the virtual reality setting, wherein the run-time file includes playback of one of a video or audio file.

14. The computer program product of claim 8, wherein the computer readable program code is configured to:
trigger a trouble-shooting process, in response to selection of the icon, disclosed to the user in the augmented reality scene, wherein the trouble-shooting process is based on the digital information associated with the physical object.

15. A training system, comprising:
a computer server;
an augmented reality device in communication with the computer server, wherein the augmented reality device is configured to display an augmented reality superimposed on a physical environment;
a second device in communication with the computer server and the augmented reality device; and
a processor in at least one of the computer server, the augmented reality device, and the second device, wherein the processor is configured to:
receive image data of a physical object pointed to by a first user, viewed through an augmented reality scene;
identify a point on the physical object pointed to by the user;
receive by the processor, digital information input by the user, wherein the digital information is associated with the first object;
associate by the processor, digital information input by the user, wherein the digital information is associated with the physical object;
generate an icon displayed to represent the digital information;
display the icon as attached to the physical object in the augmented reality scene;
receive image data of a virtual instance of the physical object in [the] virtual reality environment, viewed by a second user in the virtual reality environment, wherein the physical object is viewed by the first user in the augmented reality scene contemporaneously with the second user viewing the virtual instance of the physical object in the virtual reality environment;
identify a location on the virtual instance of the physical object corresponding to the point on the physical object;
attach an anchor to the identified location on the virtual instance of the physical object corresponding to the point on the physical object, wherein the identified location for the anchor is based on identifying fiducial markers surrounding the identified location and the anchor is attached in place relative to the surrounding fiducial markers;
synchronize the received digital information associated with the physical object to the anchor attached to the virtual instance of the physical object;
attach the icon to the anchor;
attach the synchronized received digital information to the icon;
synchronize access to the attached synchronized digital information in the icon for simultaneous access between the virtual reality environment and the augmented reality scene;
display the icon in the virtual reality environment contemporaneously with the display of the icon in the augmented reality scene;
retrieve the digital information attached to the icon from the stored file in response to a user selection of the icon; and
display the retrieved digital information in the augmented reality scene contemporaneously with a display of the retrieved information in the virtual reality environment.

16. The system of claim 15, wherein the processor is further configured to:
receive a user selection of the icon while the user is operating in the augmented reality scene;
retrieve the digital information associated with the point on the physical object from the stored file in response to the received user selection of the icon; and
trigger a run-time file execution disclosing the digital information in the augmented reality scene for the user.

17. The system of claim 15, wherein the virtual instance of the object is an exact digital replica of the physical object and the computer readable program code is configured to:
retrieve a stored file of the exact digital replica of the physical object;
identify a location on the exact digital replica of the physical object corresponding to the point on the physical object;
attach the anchor to the location on the digital replica of the physical object corresponding to the point on the physical object; and
synchronize the received digital information associated with the physical object to the anchor attached to the exact digital replica.

18. The system of claim 17, wherein
the point on the physical object is a fiducial marker; and
the processor is further configured to:
associate a replicated point of the fiducial marker on the exact digital replica of the physical object with the digital information; and
display the icon representing the digital information on the exact digital replica of the physical object.

* * * * *